United States Patent
Vennemann et al.

(10) Patent No.: US 6,710,110 B1
(45) Date of Patent: Mar. 23, 2004

(54) ELASTOMERIC MIXTURE WITH HIGH THERMAL CONDUCTIVITY

(75) Inventors: Norbert Vennemann, Osnabrück (DE); Werner Degel, Buchholz (DE)

(73) Assignee: Phoenix AG, Hamburg (DE)

( * ) Notice: Subject to any disclaimer, the term of this patent is extended or adjusted under 35 U.S.C. 154(b) by 285 days.

(21) Appl. No.: 09/869,852

(22) PCT Filed: Nov. 2, 2000

(86) PCT No.: PCT/DE00/03945

§ 371 (c)(1),
(2), (4) Date: Jul. 6, 2001

(87) PCT Pub. No.: WO01/34698

PCT Pub. Date: May 17, 2001

(30) Foreign Application Priority Data

Nov. 8, 1999 (DE) .......................................... 199 53 705

(51) Int. Cl.$^7$ ................................................. C08K 3/04
(52) U.S. Cl. ........................ 524/430; 524/495; 524/496
(58) Field of Search ................................ 524/495, 496, 524/430

(56) References Cited

U.S. PATENT DOCUMENTS

| | | |
|---|---|---|
| 4,035,565 A | 7/1977 | Apotheker et al. |
| 4,214,060 A | 7/1980 | Apotheker et al. |
| 4,576,992 A * | 3/1986 | Buding et al. .............. 525/211 |
| 5,472,044 A | 12/1995 | Hall et al. |
| 5,665,212 A * | 9/1997 | Zhong et al. ................ 429/105 |

FOREIGN PATENT DOCUMENTS

| | | |
|---|---|---|
| DE | 38 13 200 | 11/1989 |
| EP | 0 864 823 | 2/1998 |
| GB | 1 443 862 | 7/1976 |
| WO | WO 99/32557 | 12/1998 |
| WO | WO 99/32542 | 7/1999 |

OTHER PUBLICATIONS

"Entwicklung eines Elastomerwerkstoffs auf Basis von EPDM für den Einsatz in thermischen Sonnenkollektoren", Bartelsen et al, KGK Kautschuk Gummi Kunststoffe 50$^{th}$ year, No. 11/97, pp. 766–775. 1997.

* cited by examiner

*Primary Examiner*—Robert Harlan
(74) *Attorney, Agent, or Firm*—Collard & Roe, P.C.

(57) ABSTRACT

The invention relates to an elastomeric mixture, in particular based on EPM or EPDM, with an added thermally conducting component. The mixture, for the purpose of production of a tube for use as a solar collector and heat exchanger, is characterised by the following composition (in parts by weight): rubber components 50–100; thermally conducting components 50–150; carbon black 5–40; calcium oxide 2–15; peroxide cross-linking agent 4–15; activator 1–5. In particular, graphite is added as thermally conducting material. Further useful mixture parameters are disclosed.

11 Claims, No Drawings

ELASTOMERIC MIXTURE WITH HIGH THERMAL CONDUCTIVITY

CROSS REFERENCE TO RELATED APPLICATIONS

Applicants claim priority under 35 U.S.C. §119 of German Application No. 199 53 705.4, filed on Nov. 8, 1999. Applicants also claim priority under 35 U.S.C. §365 of PCT/DE00/03945 filed Nov. 2, 2000. The international application under PCT article 21(2) was not published in English.

DESCRIPTION

The invention relates to an elastomeric mixture, in particular based on EPM or EPDM, to which a thermally conductive component is added especially for the purpose of producing a hose for use as a solar collector and heat exchanger.

Now, two development works in this special field are introduced in the following in greater detail.

(A) Published document EP-A-0 864 823 describes a hose that is comprised of an inner layer made of elastomeric or plastic material, as well as of a thermally conductive reinforcement arranged on top of the inner layer and joined with the inner layer in an adhesive manner. The reinforcement is covered in this connection by an outer layer that consists of the same material as the inner layer. As an alternative, the reinforcement also can be dyed by means of a special coating, preferably with a black dye.

While suction and pressure hoses, for example pump hoses, hydraulic hoses and safety hoses for chemicals are necessarily provided with at least one reinforcing insert, hoses to be used as solar collectors and heat exchangers may be free of reinforcements as well.

Therefore, the development described above is necessarily intended for hoses with integrated reinforcements.

Furthermore, a drawback is that the reinforcement is comprised of only a limited proportion in terms of dimension with respect to the thickness of the wall of the hose. The consequence thereof is that the increased thermal conductivity connected with said measure does not cover the entire wall of the hose.

(B) A hose is introduced in the trade journal "KGK Kautschuk Gummi Kunststoffe", 50th Year, No. 11/97 (pages 766 to 775) that is comprised of an elastomer mixture to which a thermally conductive component is added, in particular under the aspect of aluminum powder.

However, in the manufacture of such hoses, the problem that had to be dealt with until now is that partial or complete demixing of the thermally conductive component was found to occur in the course of extrusion. However, a distribution of said component in the elastomer mixture that is as uniform as possible is a precondition for high thermal conductivity, on the one hand. On the other hand, extrusion (injection molding) is an important processing technology in the manufacture of hoses.

Against the background of the overall problem described above, the problem of the invention is to provide an elastomeric mixture for a hose as defined above that can be extruded in connection with an enhanced thermal conductivity of $\lambda > 1$ W/m° K. while maintaining at the same time the rubber-elastic properties and specifically satisfying the required injection smoothness, which is important for obtaining good thermal conductivity (heat transfer).

Said problem is solved by an elastomeric mixture with the following composition (in parts by weight), whereby the useful mixing range of each component is stated in parentheses:

| Rubber component | 50 to 100 | (60 to 80) |
|---|---|---|
| Thermally conductive component | 50 to 150 | (70 to 120) |
| Dying soot | 5 to 40 | (10 to 30) |
| Calcium oxide | 2 to 15 | (2 to 10) |
| Peroxidic cross-linking agent | 4 to 15 | (5 to 12) |
| Activator | 1 to 5 | (1 to 4) |

Especially EPM and EDDM are employed as rubber components, whereby said abbreviations stand for the following:

| EPM = | ethylene-propylene copolymer |
|---|---|
| EPDM = | ethylene-propylene-diene copolymer. |

Said two types of rubber are characterized by high resistance to weathering.

The dying soot is, for example an amorphous carbon black.

The peroxidic cross-linking agent used is, for example di(tert.-butylperoxi-isopropyl)benzene.

The activator is, for example triallylcyanurate (TAC).

Furthermore, it is advantageous if a substantially non-cross-linked plastic, in particular polyethylene based on VLDPE (=very low density polyethylene) is added to the elastomeric mixture, whereby its proportion amounts to 10 to 50 parts by weight, in particular 20 to 40 parts by weight.

The thermally conductive component preferably in the form of graphite, is first mixed with the plastic or VLDPE, which is then followed by the subsequent preparation of the total mixture. Demixing in the course of extrusion is additionally counteracted in this way.

Further additives of the elastomeric mixture with the following composition may include the following components (in parts by weight):

| Polyoctenamer | 0 to 50 | (20 to 40) |
|---|---|---|
| Parafinic plasticizer | 0 to 20 | (0 to 10) |
| Processing aids | 0 to 20 | (0 to 10) |
| Hydrocarbon resin | 0 to 20 | (0 to 10) |
| Metal oxide | 0 to 20 | (2 to 15) |

The processing aids used are, for example mixtures of fatty acids and/or fatty acid derivatives.

A metal oxide based on magnesium and/or zinc is preferably employed.

Furthermore, it is advantageous if the thermally conductive component is present in the form of fibers or small leaves, whereby the main direction of expanse of such particles substantially extends in the radial form of the hose. The thermal conductivity is optimized in this way.

The parameters specified in connection with the thermal conductivity are follows:

| W = | watt |
|---|---|
| M = | meter |
| ° K = | degree Kelvin |

What is claimed is:

1. An elastomeric mixture particularly based on EPM or EPDM, to which a thermally conductive component is added for the purpose of producing a hose for use as a solar collector and heat exchanger, comprising the following composition of the mixture (in parts by weight):

| | |
|---|---|
| rubber component | 50 to 100 |
| thermally conductive component | 50 to 150 |
| dying soot | 5 to 40 |
| carbon black | 2 to 15 |
| peroxidic cross-linking agent | 4 to 15 |
| activator | 1 to 5 and | a substantially non-cross-linked plastic added to said mixture; and said plastic being the polyethylene VLDPE.

2. The elastomeric mixture according to claim 1, comprising the following composition (in parts by weight):

| | |
|---|---|
| rubber component | 60 to 80 |
| thermally conductive component | 70 to 120 |
| carbon black | 10 to 30 |
| calcium oxide | 2 to 10 |
| peroxidic cross-linking agent | 5 to 12 |
| activator | 2 to 4. |

3. The elastomeric mixture according to claim 1, wherein the proportion of plastic amounts to 10 to 50 parts by weight.

4. The elastomeric mixture according to claim 3, wherein the proportion of plastic amounts to 20 to 40 parts by weight.

5. The elastomeric mixture according to claim 1, wherein the thermally conductive component is first mixed with the plastic, in conjunction with the subsequent preparation of the total mixture.

6. The elastomeric mixture according to claim 1, comprising further additives in the following composition (in parts by weight):

| | |
|---|---|
| polyoctenamer | 0 to 50 |
| paraffinic plasticizer | 0 to 20 |
| processing aids | 0 to 20 |
| hydrocarbon resin | 0 to 20 |
| metal oxide | 0 to 20. |

7. The elastomeric mixture according to claim 6, comprising further additives in the following composition (in parts by weight):

| | |
|---|---|
| polyoctenamer | 2 to 40 |
| paraffinic plasticizer | 0 to 10 |
| processing aids | 0 to 10 |
| hydrocarbon resin | 0 to 10 |
| metal oxide | 2 to 15. |

8. The elastomeric mixture according to claim 6, wherein a metal oxide based on magnesium and/or zinc is used.

9. The elastomeric mixture according to claim 1, wherein graphite is used as the thermally conductive component.

10. The elastomeric mixture according to claim 1, wherein the thermally conductive component is used in the form of fibers or small leaves.

11. The elastomeric mixture according to claim 1, wherein the thermally conductive component has a longitudinal expanse substantially extending in the radial direction of the hose.

* * * * *